(12) United States Patent
Yu et al.

(10) Patent No.: US 6,888,980 B2
(45) Date of Patent: May 3, 2005

(54) METHODS AND TECHNIQUES FOR ACHIEVING FLATTENED AND BROADENED PASS BAND SPECTRUM FOR FREE-SPACE GRATING-BASED DENSE WAVELENGTH DIVISION MULTIPLEXERS/DEMULTIPLEXERS

(75) Inventors: Danny (Dejin) Yu, Fremont, CA (US); Li Chen, Fremont, CA (US); William (Wei) Yang, Fremont, CA (US); Charlie (Shu) Zhang, Fremont, CA (US); Jie Yang, Fremont, CA (US)

(73) Assignee: BaySpec, Inc., Fremont, CA (US)

( * ) Notice: Subject to any disclaimer, the term of this patent is extended or adjusted under 35 U.S.C. 154(b) by 211 days.

(21) Appl. No.: 10/315,899

(22) Filed: Dec. 9, 2002

(65) Prior Publication Data

US 2003/0123791 A1 Jul. 3, 2003

Related U.S. Application Data (60) Provisional application No. 60/340,221, filed on Dec. 13, 2001.

(51) Int. Cl.[7] ............................ G02B 6/28; G02B 6/32; G02B 6/34

(52) U.S. Cl. .............................. 385/24; 385/33; 385/37
(58) Field of Search ............................... 385/24, 33, 37

(56) References Cited

U.S. PATENT DOCUMENTS

| | | | | |
|---|---|---|---|---|
| 6,477,293 | B1 * | 11/2002 | Golub | 385/24 |
| 6,750,995 | B2 * | 6/2004 | Dickson | 359/15 |
| 6,782,205 | B2 * | 8/2004 | Trisnadi et al. | 398/94 |
| 2002/0008921 | A1 * | 1/2002 | Ebizuka et al. | 359/837 |
| 2002/0109917 | A1 * | 8/2002 | Sagan et al. | 359/484 |

* cited by examiner

*Primary Examiner*—John D. Lee
*Assistant Examiner*—Tina M Lin
(74) *Attorney, Agent, or Firm*—Justin Boyce; Dechert LLP (57) ABSTRACT

A device for expanding the wavelength band of an optical component is disclosed. The device has a beam splitter for splitting a wavelength division multiplexed beam into two beams at a desired separation angle. An optical grating separates the two beams into spectral components for each beam. The spectral components are focused on a receiving surface. The separation angle between the two beams expands the wavelength band of the WDM signal.

32 Claims, 11 Drawing Sheets

METHODS AND TECHNIQUES FOR ACHIEVING FLATTENED AND BROADENED PASS BAND SPECTRUM FOR FREE-SPACE GRATING-BASED DENSE WAVELENGTH DIVISION MULTIPLEXERS/ DEMULTIPLEXERS

RELATED APPLICATIONS

This application claims priority to U.S. Provisional Patent Application Ser. No. 60/340,221, filed on Dec. 13, 2001, entitled METHODS AND TECHNIQUES FOR ACHIEVING FLATTENED AND BROADENED PASS BAND SPECTRUM FOR FREE-SPACE GRATING-BASED DENSE WAVELENGTH DIVISION MULTIPLERS/ DEMULTIPLEXERS, the contents of which are incorporated herein be reference.

Furthermore, this patent application related to U.S. Provisional Patent Application Ser. No. 60/301,958, filed on Jun. 28, 2001, entitled METHODS AND DESIGNS FOR ACHIEVING WIDE WAVELENGTH PASS BAND IN OPTICAL COMMUNICATION DEVICES, U.S. patent application Ser. No. 10/185,586, filed on Jun. 28, 2002, entitled METHODS AND DESIGNS FOR ACHIEVING WIDE WAVELENGHT PASS BAND IN OPTICAL COMMUNICATION DEVICES, U.S. Provisional Patent Application Ser. No. 60/338,858, filed on Dec. 7, 2001, entitled, PASS BAND FLATTENING AND BROADENING METHODS AND TECHNIQUES FOR FREE-SPACE GRATING-BASED DENSE WAVELENGTH DIVISION MULTIPLEXING DEVICES, U.S. patent application Ser. No. 10/313,150, filed on Dec. 6, 2002, entitled METHOD AND SYSTEM FOR PASS BAND FLATTENING AND BROADENING OF TRANSMISSION SPECTRA USING GRATING BASED OPTICAL DEVICES, the contents of which are incorporated herein by reference.

BACKGROUND OF THE INVENTION

1. Field of the Invention

The present invention relates generally to methods and devices of flattening and broadening the pass band spectra of optical elements and devices that require flat and wide wavelength pass band, and, in particular, to methods and devices of flattening and broadening the pass band spectrum for grating-based optical components used for transmitting and receiving laser light through a single-mode optical fibers of multi-channel optical communications networks.

2. Status of the Prior Art

Fiber optic networks are becoming increasingly popular and important for high-speed and large capacity data transmission. The networks are continuously growing due to the explosive expansion of telecommunications and computer communications, especially in the area of the Internet. This has created a dramatic increase in the volume of worldwide data traffic and has placed an increased demand for communication networks to provide increased bandwidth. To meet this demand, fiber-optic (light wave) communication systems have been developed to harness the enormous usable bandwidth (tens of tera-Hertz) of a single optical fiber transmission link. Because it is impossible to exploit all of the bandwidth of an optical fiber using a single high-capacity channel, wavelength division-multiplexing (WDM) fiber-optic systems have been developed to provide high-capacity transmission of multi-carrier signals over a single optical fiber thereby channelizing the bandwidth of the fiber.

In accordance with WDM technology, a plurality of superimposed concurrent signals are transmitted on a single fiber whereby each signal has a different wavelength. WDM technology takes advantage of the relative ease of signal manipulation in the wavelength, or optical frequency domain, as opposed to the time domain. In WDM networks, optical transmitters and receivers are tuned to transmit and receive on a specific wavelength such that many signals operating at distinct wavelengths share the single fiber.

Wavelength multiplexing devices are commonly used in fiber-optic communications system to generate a single multi-carrier communication signal stream in response to a plurality of concurrent signals each having different wavelengths and received from associated sources or channels for transmission on the single fiber. At the receiving end, wavelength division demultiplexing devices are commonly used to separate the composite wavelength signal into the several original signals each having a different wavelength.

Some of the most important components in the wavelength division system are demultiplexers, multiplexers, optical/add/drop multiplexers, and wavelength selective switches. It is advantageous to have wide wavelength pass bands for these components without degrading the signal performance and increasing the insertion loss. Although the operating wavelength for each of the transmitter lasers is tuned to the ITU grid wavelengths as close as possible when it was manufactured, there is always some offset to the ITU wavelength grid. Accordingly, the wider the pass window (i.e., pass band), the more tolerant is the laser offset specification such that it is easier to adjust the system. Also, there is always some drift, both in terms of the laser center wavelengths and the center wavelength of the pass band itself, such that the wider pass band allows the system to be more tolerant so that the center wavelength can 'walk out' the 'passing window' of the demultiplexer. Furthermore, the wider the pass band, the flatter the pass window will be. Therefore when many components are cascaded in series, the total pass band shape will not deteriorate quickly and the signal can travel farther without re-conditioning.

In free-space grating-based devices, such as multiplexers, demultiplexers, optical add/drop multiplexers, wavelength-selective switches, etc. . . . , either transmissive or reflective diffraction gratings are employed as spectral dispersion elements. The position of a given spectral component is a function of the diffraction angle. For example, in a narrow spectral range (C-band, L-band, or C+L-band), the geometrical separation between two neighboring ITU channels is approximately equal. Single-mode fiber arrays are used to couple the diffracted light field and transmit individual channel signals. The spectral response near the pass band portion outputted from a given single-mode fiber is substantially Gaussian with a "narrow" bandwidth. Such a spectral shape is not desirable and it would be better to broaden and flatten the Gaussian pass band spectra.

SUMMARY OF THE INVENTION

It is therefore an object of the present invention to provide optical methods to design and manufacture optical components with desired pass band spectral response.

Another object of the present invention is to provide optical methods and techniques that can broaden the pass band shapes of optical components.

Further another object of the present invention is to provide optical methods and techniques that can flatten the pass band shapes of optical components.

Yet another object of the present invention is to provide a design process that reduces channel cross-talk while producing wide pass band optical components.

Yet still another object of the present invention is to provide methods of manufacturing wide pass band optical components with large volume capacity.

A further object of the present invention is to provide a design process that has far fewer process steps, thus far fewer numbers of equipment to manufacture.

Another important object of the present invention is to provide free-space DWDM devices that are easy to manufacture in large quantity using components that are easy to make.

Briefly, presently preferred embodiments of the present invention provide methods and processes for producing wide pass band optical components for fiber-optic networks, including methods and processes for making the bulk (free-space) grating-related optical components within or based on glass materials, and manipulating light beam distributions, in terms of both spatial and spectral distributions. The components include an input means comprising beam separation and collimating; a grating means built into one means for diffracting light; means for combining grating with beam shaping means made of optical materials; beam shaping means on micro optical array components; means for shaping the beam through optical components with phase structures.

Important advantages of the methods and processes of the present invention is that it is able to provide manufacturing methods to manufacture DWDM optical components with wide pass band and, more importantly, at highly repeatable manufacturing process, and at lower cost.

The forgoing and other objects, features, and advantages of the present invention will be apparent from the following detailed description of the preferred embodiments, which make reference to the several figures of the drawing.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENTS

Referring now to the drawings wherein the showings are for purposes of illustrating a preferred embodiment of the present invention only, and not for purposes of limiting the same, FIG. 1(a) illustrates a prior art grating-based demultiplexing device 1000 to separate the wavelengths of an optical beam from an input optical fiber. When the device 1000 operates as a demultiplexer, an input fiber 110 transmits a composite signal containing a plurality of wavelengths from a WDM network. A divergent beam 120 from the input fiber 110 is collimated by a lens 130. A parallel beam 140 from the lens 130 is incident upon a diffraction grating 150. The diffraction grating 150 can be either a transmission or reflection grating and is typically a free-space grating. A dispersed beam 160 is generated from the parallel beam 140 by the diffraction grating 150. The dispersed beam 160 is focused by a focusing lens 170 onto a fiber array 180 having a series of single-mode fibers 190. The fiber array 180 can be made by stacking one or more rows of substantially closely spaced, end-flushed and AR (anti-reflection) coated optical fibers 190 in well-aligned silicon V-grooves. It will be recognized by those of ordinary skill in the art that the device 1000 can also operate as a wavelength multiplexer. In that case, a series of channels are inputted from the fibers 190, then assembled, or multiplexed, and outputted from the fiber 110.

The diffraction grating 150 may be a volume phase grating having two parts, a diffractive element and a substrate. Such volume phase gratings are further described in U.S. Pat. Nos. 6,108,471 and 6,275,630 B1, the contents of which are incorporated herein by reference. The substrate is preferably made from a low scattering glass material. All the surfaces are preferably coated with an anti-reflection coating to enhance the passage of radiation. The transmission diffractive element is made by a holographic technique utilizing photosensitive media having a sufficient thickness. Preferably a volume hologram is used for the diffractive element so that diffractive efficiency is high and the operating wavelength range is broad. The photosensitive media are preferably materials that are able to achieve high spatial resolution in order to generate high groove density and thus high spectral resolution for WDM applications. The photosensitive media are preferably materials that have low light scattering, low optical noise and are capable of transmitting the wavelengths of interest to fiber optic networks. An example of such a photosensitive media is dichromated gelatin (DCG).

FIG. 1(b) is a graph showing a transmitted signal spectrum received by the fiber array 190. The spectrum peaks 192 have the shape of a Gaussian pass band profile on a top portion of the spectrum 194 and a pass band region 196. This phenomenon not only happens in the transmission grating-based demultiplexer device 1000 shown in FIG. 1(a), but also in reflection grating-based demultiplexer devices when a single-mode fiber is used to receive the demultiplexed signals.

Figure 2:
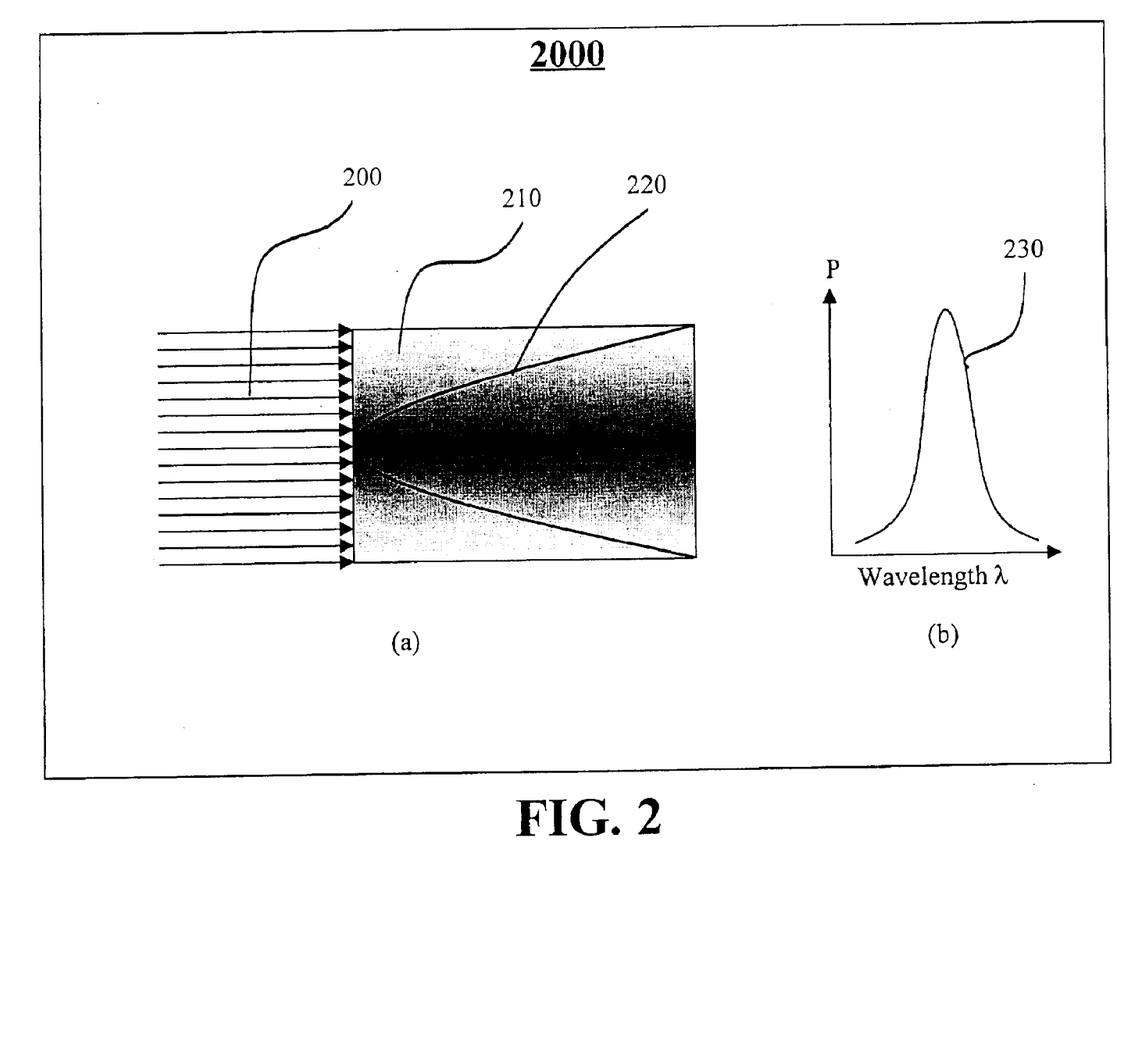
FIGS. 2(a) and 2(b) are graphs schematically showing the coupling between a uniform diffraction field and a single-mode fiber.

The Gaussian pass band profile is not desirable in many optical communications systems. However, it is generated when the diffracted field is coupled with the single-mode fibers because the fundamental mode (i.e., the first mode) in the fiber is approximately Gaussian. The cross integral between the fundamental Gaussian field and another uniform diffracted field, even another Gaussian field, is still Gaussian-like. FIG. 2(a) illustrates the concept of coupling between a uniform incident field 200 and a single-mode fiber 210 that leads to a Gaussian spectral response such as the spectrum 230 shown in FIG. 2(b). Physically, the coupling efficiencies for the different spectral components that are located at varying spatial positions are different. More specifically, the spectral components at the center of the fiber have the largest coupling efficiency. By contrast, the spectral components corresponding to beams at the edges of the fiber are less effectively coupled into fiber and thus weaker in output. Accordingly, the Gaussian spectral response 230 is generated.

However, optical communications systems prefer to have a wavelength demultiplexer with a wide pass band and a flat-top profile and not the spectrum profile 230 shown in FIG. 2(b). Although the operating wavelength for each of the transmitter lasers is tuned as close as possible to the ITU grid wavelengths when it was manufactured, there is always some offset to the ITU wavelength grid. Thus the wider the pass window, the more tolerant the laser offset specification can be and thus the easier for the system to be operated. Also, there is always some wavelength drift, both in terms of the laser center wavelength and the center wavelength of the pass band itself. A wider pass band allows the system to tolerate larger drifts so that the center wavelength is able to 'walk off' the 'pass window' of the demultiplexer.

Figure 3:
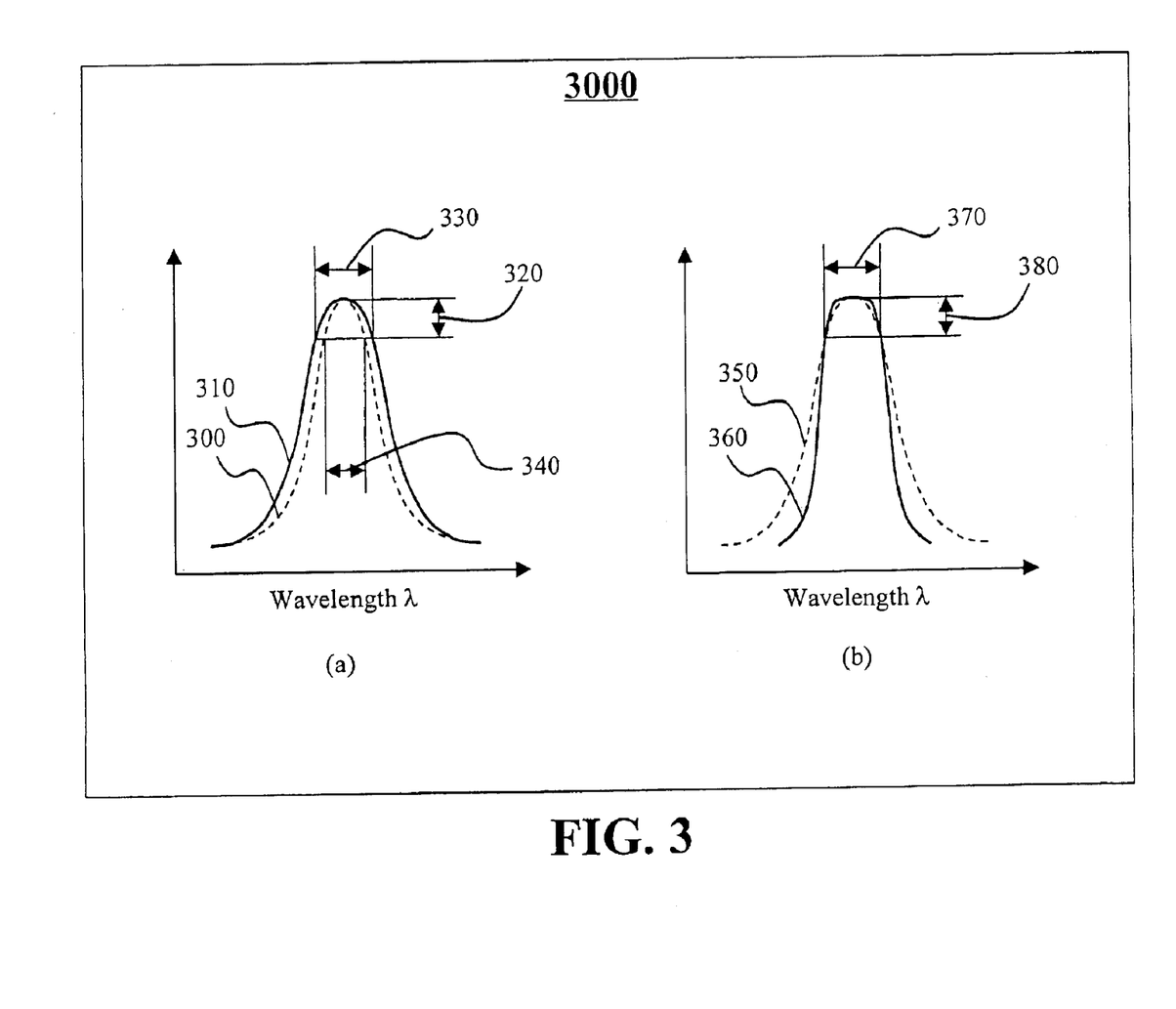
FIGS. 3(a) and 3(b) are graphs showing the concept of using a wider wavelength pass band for a given channel.

Referring to FIG. 3(a), two respective transmission spectra 300 and 310 are shown. The spectrum 300 has a relatively narrow pass band 340 compared to the transmission spectrum 310 which has relatively wider pass band 330. The insertion loss 320 is the vertical height measured from the peak point downward, typically to the 0.5 dB, or 1 dB point. The pass bandwidths 330, 340 are measured in terms of wavelength for the two spectra respectively. As seen in FIG. 3(a), the pass bandwidth 330 is larger than 340 for the same insertion loss 320 because the two spectra are different in their shapes. Thus spectrum 310 has wider pass band 330, so that the shape of spectrum 310 is more desirable than that of spectrum 300. However, there is a trade-off between the broadening pass band and increasing channel isolation. For the Gaussian spectral response, the wider the pass band, the lower the isolation between adjacent channels.

FIG. 3(b) shows two preferred transmission spectra 350 and 360 that have the same pass bandwidth 370 at the same insertion loss 380. The spectrum 350 is the same as spectrum 310 in FIG. 3(a) such that pass bandwidths 370 and 330 are equal. The spectrum 360 differs from spectrum 350 by having a substantially flat-top spectral response, and having a narrow spectral width at a low power level (e.g., 40 dB). Accordingly, lower cross-talk between adjacent channels will be exhibited. The flat-top spectral response of spectrum 360 is more desirable than spectrum 350 when optical signals are transmitted through several spectral components in a WDM networks. The cumulative pass bandwidth of each channel does not become much narrower than that of a single-stage Mux/Demux device with the spectrum 360. The flat-top spectral response spectrum 360 with a wide pass band and a high isolation level is preferred more.

Figure 4:
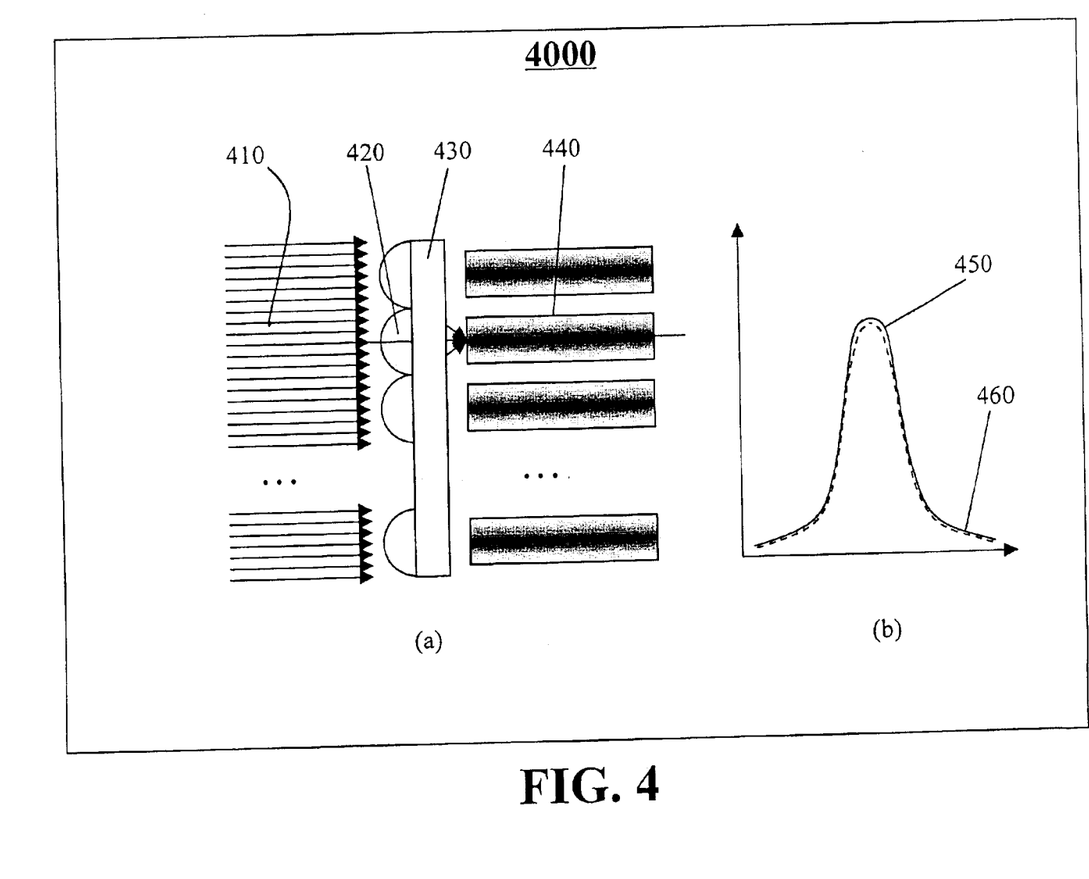
FIG. 4(a) is a diagram showing a microlens array with a cylindrical lenses.
FIG. 4(b) is a graph of the transmission spectrum for the microlens array of FIG. 4(a).

As previously mentioned for FIG. 2(a), a uniform incident field 200 is coupled to a single-mode fiber 210 and leads to a Gaussian spectral response such as the spectrum 230 (FIG. 2(b)). A microlens array may be used to couple the diffracted wavelength components into the fiber array (and the single mode fibers thereof) in order to increase coupling efficiency. The microlenses of the array not only increase the coupling efficiency but may also be able to widen the pass band of the transmission spectrum for a receiving fiber. FIG. 4(a) illustrates a process of obtaining a widened wavelength pass band with a microlens array 430. A microlens 420 of the microlens array 430 collects a band of incident field components from incident field 410 ranging in wavelength from $\lambda$ to $\lambda+\Delta\lambda$. The microlens 420 focuses and centers the incident field 410 on the center of a respective optical fiber 440. Referring to FIG. 4(b), a widened spectrum 450 with a broad Gaussian profile is generated with the microlens array 430. For comparison, a spectrum 460 is generated without the use of the microlens array 430. The microlens array 430 is normally placed in front of the receiving fibers 440, as is commonly known. The microlenses 420 are made by photolithographic techniques and are commonly spherical lenses. When used in multiplexer/demultiplexer devices, cylindrical lenses are preferred because the lens in the perpendicular dimension has a radius of infinity. Alternatively, the surface of a microlenses 420 can be non-spherical, or even arbitrary so that the field components within the pass band wavelength range can be equally coupled into the fiber.

Although the use of the microlens array 430 can broaden the pass bandwidth to finite extent, in practice, it is difficult to obtain a flat-top pass band and reduce channel cross-talk. The size of the microlenses 420 are quite small and further diffraction will result such that the focusing area will be a finite-size spot rather than a point. Accordingly, a better approach to achieve a flat-top pass band and reduce channel cross-talk is to use a double-spot principle to modify the fields received by a single-mode fiber so that the desired shape of transmission spectrum can be produced.

Figure 5:
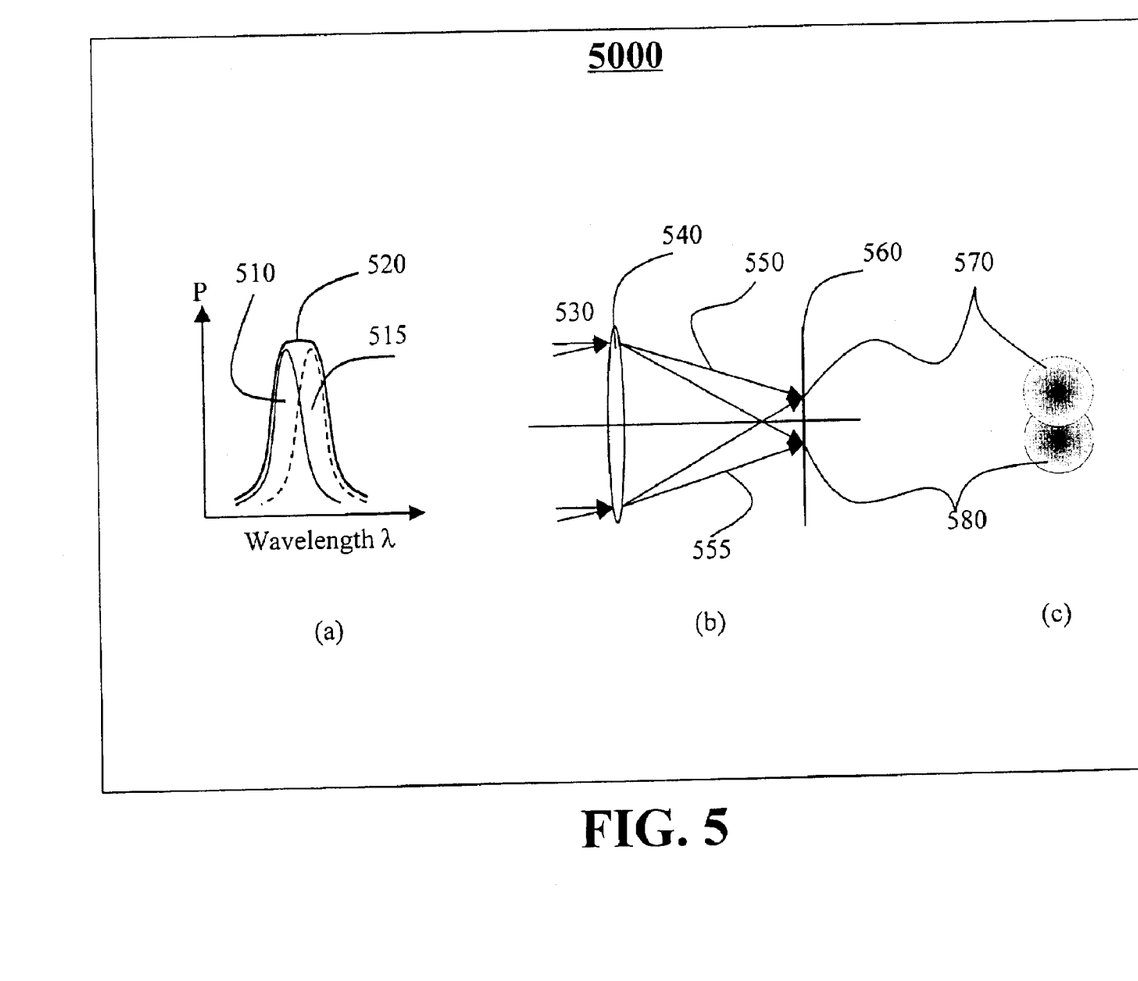
FIGS. 5(a)–5(c) illustrate a process of generating a wide wavelength pass band by combining two closely-spaced sub-spectra.

Referring to FIG. 5, the fundamental concept and process of broadening and flattening the pass band in multiplexer/demultiplexer devices, independent of dispersion elements, is shown. FIG. 5(a) illustrates that a flat-top pass band spectrum 520 with a narrow spectral skirt is achieved by combining two sub-spectra 510 and 515 together. Both sub-spectra 510 and 515 are Gaussian and have a substantially narrow pass bandwidth. Because both sub-spectra 510 and 515 have a steep spectral response, the combined spectrum 520 has a substantially narrow bandwidth at a low power level (skirt) so that the signal cross-talk between adjacent channels is reduced. In order to generate the flattened pass band requires that two similar sub-spectra be separated in wavelength by a proper amount. A dispersion element and associated optical system are needed to generate the two sets of sub-spectra with a proper wavelength shift.

Referring to FIGS. 5(b) and 5(c), the typical optical paths and field distributions for the two angular dispersed beams 530 at the same wavelength are shown. The angular dispersed beams 530, generated by a diffraction element before the focusing lens 540, contain the two sets of spectra 510, 515 slightly shifted in angle (and thus in wavelength by a corresponding small amount $\Delta\lambda$). The two sets of spectra 510, 515 for beams 530 at a desired wavelength (e.g., about 1530.33 nm) are focused to generate beams 550 and 555 with a small separating angle. Accordingly, two spots 570 and 580 are generated on a receiving plane 560. The angular distance between beams 550 and 555 corresponds to a wavelength separation of $\Delta\lambda$. Consequently, the two wavelength components with a wavelength difference $\Delta\lambda$ will overlap at the same receiving point on the receiving plane 560 because the same wavelength components coming from the different spectra separate in space. The two overlapped spectra will give rise to the flattened pass band spectrum profile 520 shown in FIG. 5(a). The dispersion elements may be a diffraction grating or dispersion prism.

Figure 6:
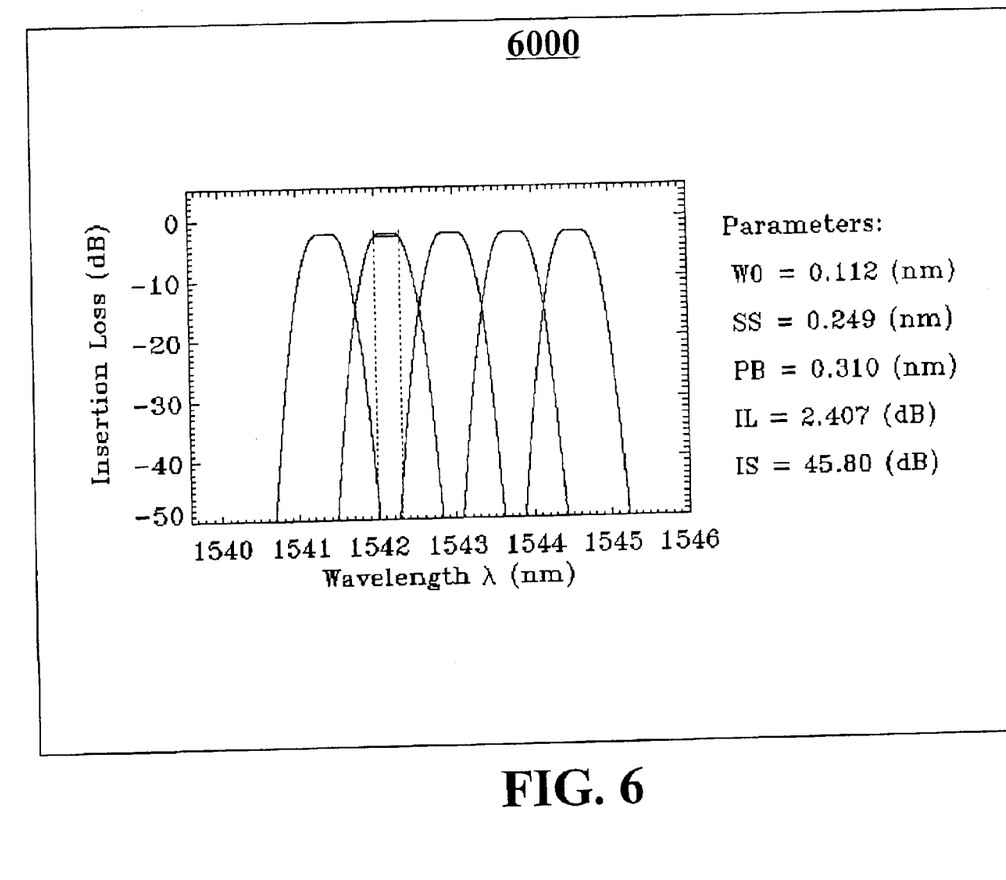
FIG. 6 is an example illustrating broadened and flattened pass band profiles by using two narrow sub-spectra.

A numerical simulation is illustrated in FIG. 6 as an example. Specifically, a demultiplexer, as shown in FIG. 5(b), with 100 GHz channel spacing is simulated. A broadened pass band spectrum with a substantial flat-top profile is generated from the combination from the two narrow sub-spectra. The resulting pass bandwidth at the 0.5 dB down power point is 0.31 nm. Each sub-spectrum has a pass bandwidth of 0.112 nm at the 0.5 dB down point and a spectral separation of 0.249 nm between sub-spectrum is required. The channel isolation is increased significantly with the isolation between adjacent channels as high as 45.8 dB. For a corresponding Gaussian response with a pass bandwidth of 0.31 nm, the isolation between adjacent channels is only 8.6 dB. The lower cross-talk is achieved as the pass bandwidth is reduced. Accordingly, the isolation level can be increased while the pass band spectrum becomes flat and wide.

Figure 7:
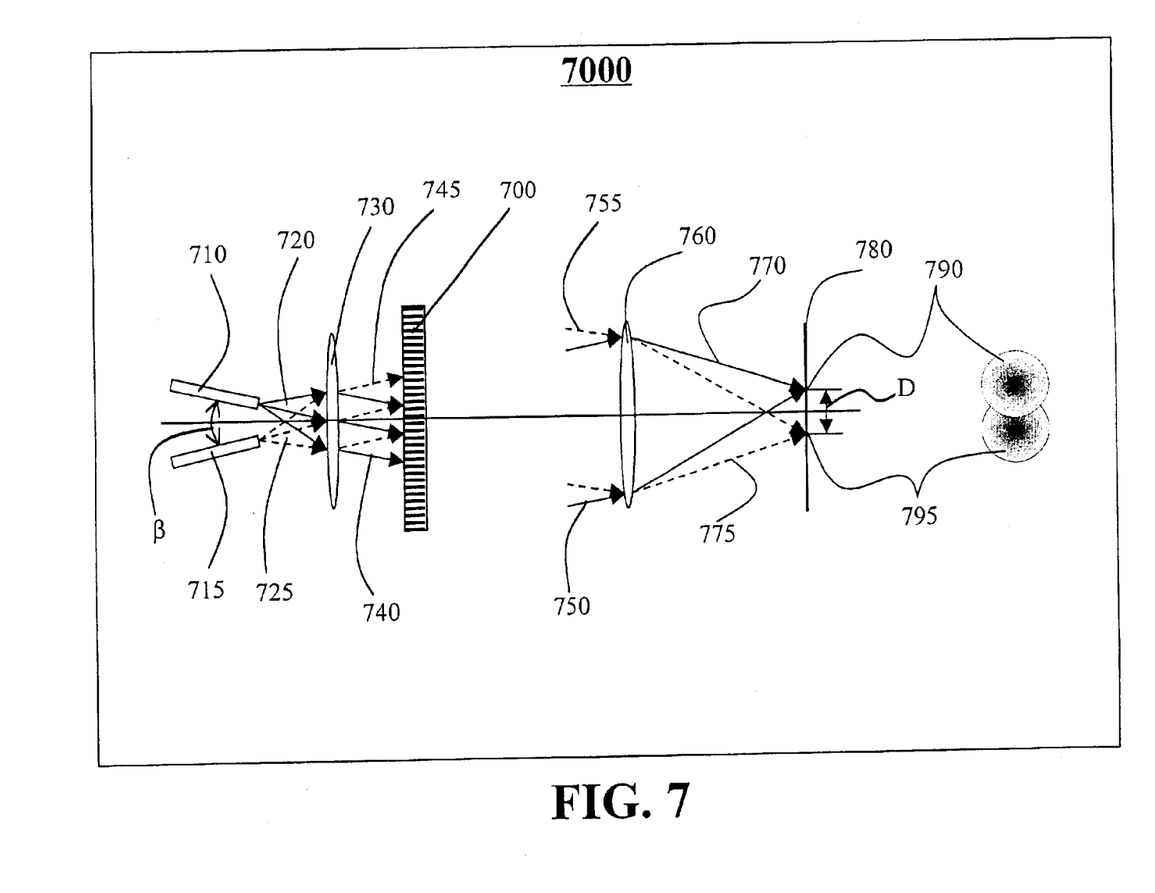
FIG. 7 is a diagram illustrating a process of generating a wide wavelength pass band by using two incident beams according to the present invention.

Referring to FIG. 7, a process of generating a wide wavelength pass band with high channel isolation by using a double input configuration on a transmission grating according to the present invention is shown. The optical system 7000 has of a pair of input optical fibers 710 and 715 positioned with a preferred angle β therebetween, a collimating lens 730, a transmission volume phase grating 700, a beam focusing unit 760, and a receiving fiber array 780. The input fibers 710, 715, and lens 730 form an input unit. The input fibers 710 and 715, transmit two identical signal beams generated from a beam division element, as will be further explained below. Two divergent beams of light 720 and 725 from respective input fibers 710, 715 are incident upon the collimating lens 730. Accordingly, two beams 740 and 745 are generated by the collimating lens 730 with the angle β therebetween and are incident on a front surface of the grating 700. Because the two groups of incident beams are separated by a finite angle β, their respective diffraction directions for a given wavelength will be slightly different. The two groups of diffracted beams 750, 755 from the grating 700 with respective diffraction angles are collected by the focusing lens 760 and focused onto the receiving plane 780 that has microlenses and fiber arrays, as previously described. For a given wavelength (i.e., about λ=1530.33 nm), two spots 790 and 795 are formed with a spatial separation D for each desired wavelength separated by the diffraction grating 700. Accordingly, two groups of diffraction spectra corresponding to the two incident angles are shifted in space. The spatial shift for a given wavelength must be consistent with the desired spectral separation required on the plane 780 in order to generate the two appropriate narrow sub-spectra used in FIG. 5(a). The angular distance between diffracted beams 750, 755 corresponds to the wavelength separation of Δλ. Consequently, the two wavelength components with a wavelength difference αλ will overlap at the same receiving point. The two overlapped spectra will give rise to the flattened pass band spectrum profile 520 shown in FIG. 5(a).

Figure 8:
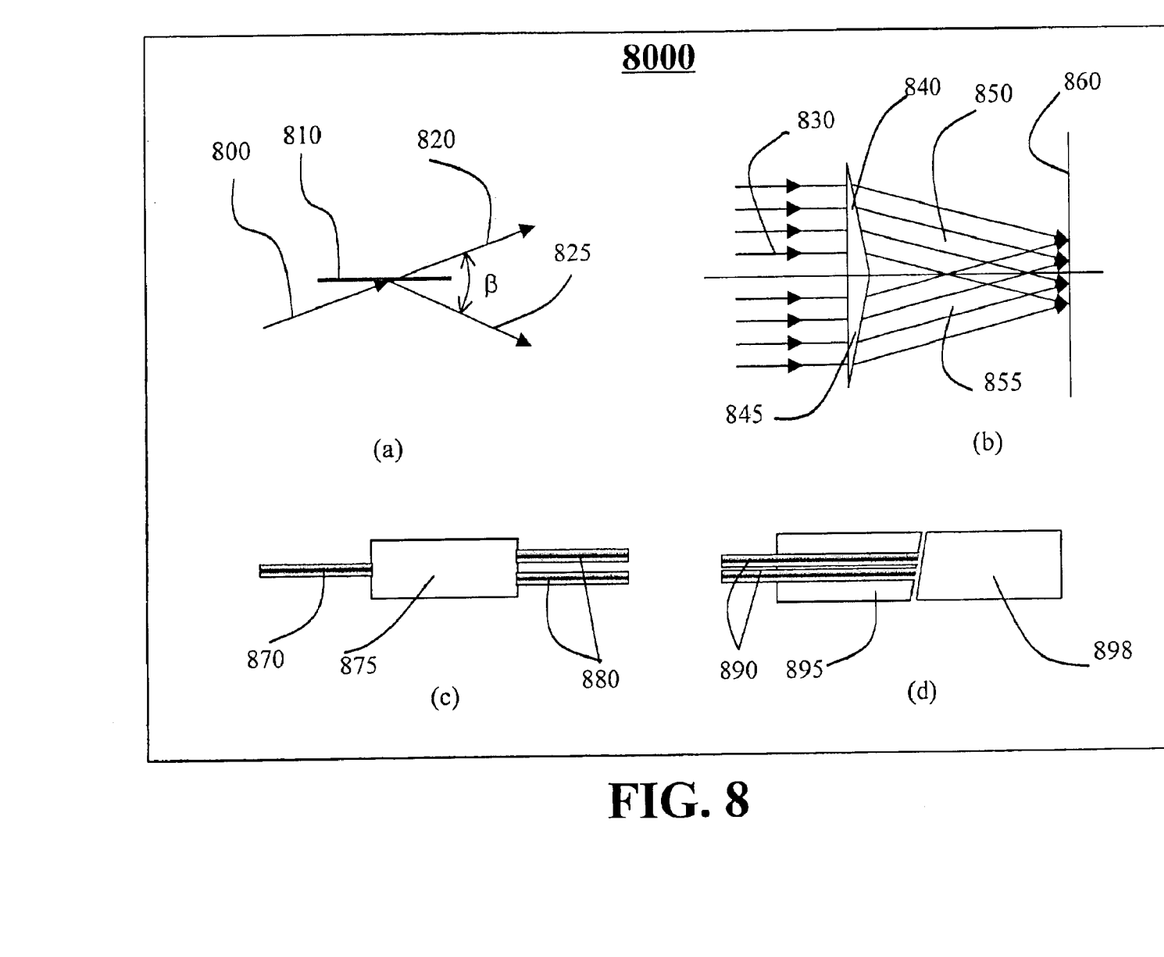
FIGS. 8(a)–8(d) illustrate devices for generating the two incident beams of FIG. 7.

There are various ways to generate the two incident beams 720 and 725 shown in FIG. 7. Referring to FIG. 8(a), a 50/50 beamsplitter 810 can be used to separate an incident beam 800 into two equal-intensity beams 820 and 825 with a separation angle β. A lens element (not shown) is also needed in conjunction with the beamsplitter 810 so that two collimated beams are produced. Alternatively, two symmetrical prisms 840 and 845, as shown in FIG. 8(b), can produce two equal-intensity beams 850, 855 with a preferred separation angle β. The uniform incident beam 830 is transformed into the two beams 850 and 855 by the prisms 840 and 845. Because the prisms are thin and the spectral range of the incident signal is relatively narrow, prism dispersion is negligible. The beams 850 and 855 are incident upon the front surface 860 of a transmission grating.

The two incident beams can also been obtained by using a 3 dB wide-band fused fiber coupler 875 as shown in FIG. 8(c). An incoming optical signal is transmitted through a single-mode optical fiber 870 and outputted through two single-mode fibers 880 with equal intensities. Furthermore, the angle between the two incident beams can be manipulated with a dual fiber capillary followed by a GRIN lens. Referring to FIG. 8(d), two input fibers 890 are positioned in a dual fiber capillary 895 with a GRIN lens 898. The angle between the two emerging beams is controlled by the pitch of the GRIN lens 898.

Figure 9:
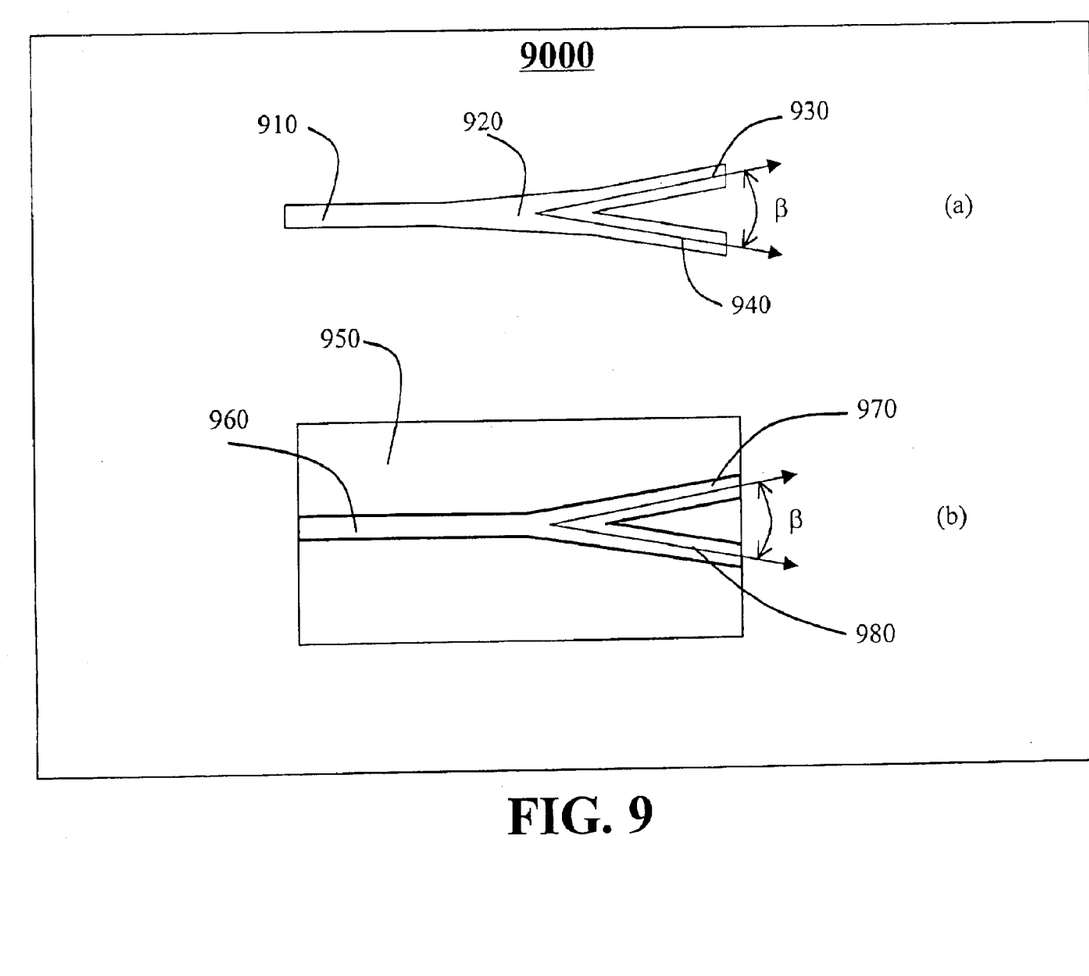
FIGS. 9(a) and 9(b) illustrate two devices for preparing the two incident beams of FIG. 7.

Additionally, it is possible to use a fused fiber to fabricate a Y-shaped 3 dB coupler in order to generate the two incident beams. Referring to FIG. 9(a), a schematic diagram for a coupler 920 is shown. The coupler 920 has in input fiber 910 which branches into a Y junction with a separation angle β. Output beams 930 and 940 are generated with the angular separation β. Furthermore, planar waveguide 950 can be used to fabricate a Y-junction. In such an example, planar input waveguide 960 branches into two waveguides 970 and 980 at a separation angle β.

Figure 1:
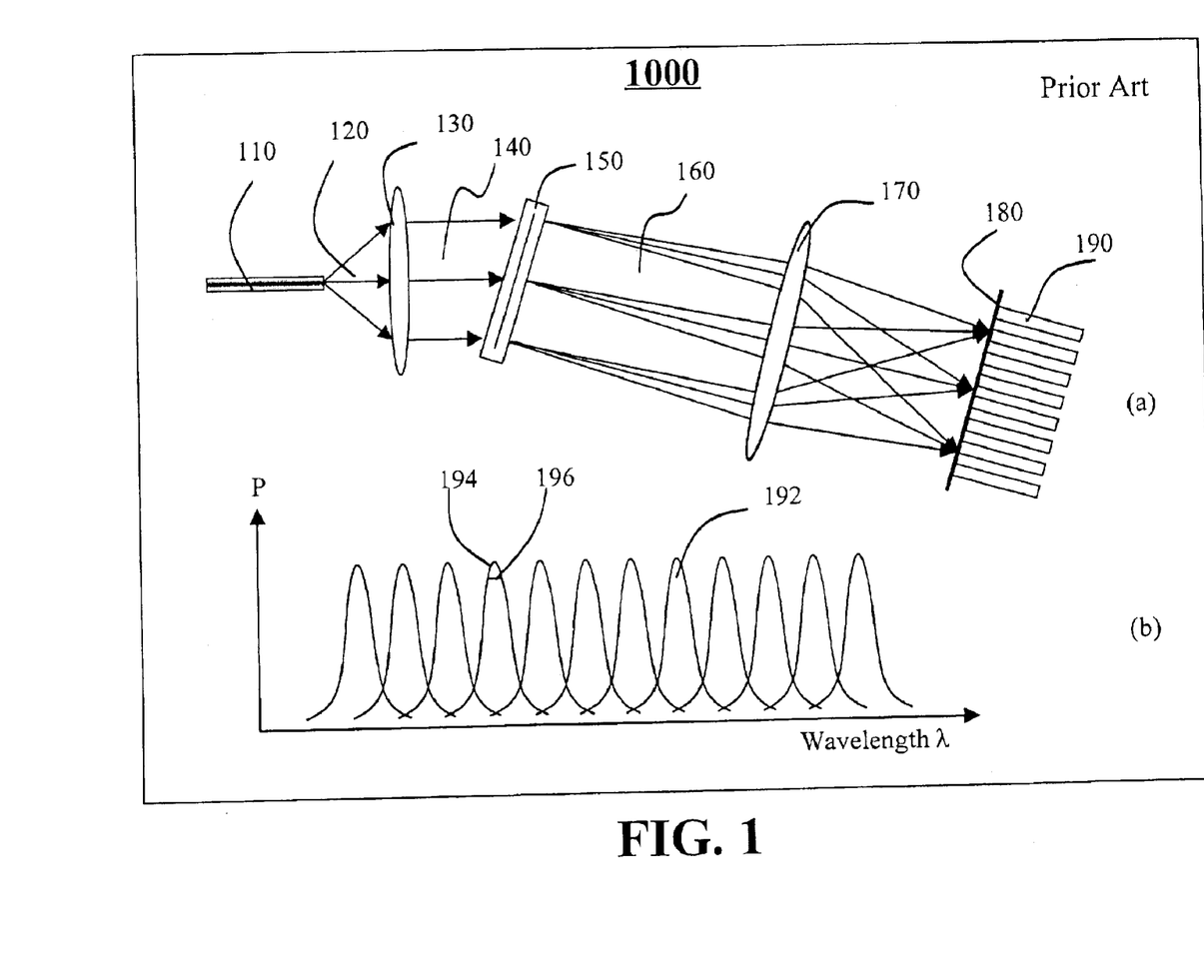
FIG. 1(a) is a diagram showing a prior art free-space grating-based demultiplexer.
FIG. 1(b) is a graph showing a typical Gaussian transmission spectrum for the demultiplexer shown in FIG. 1(a)
Figure 10:
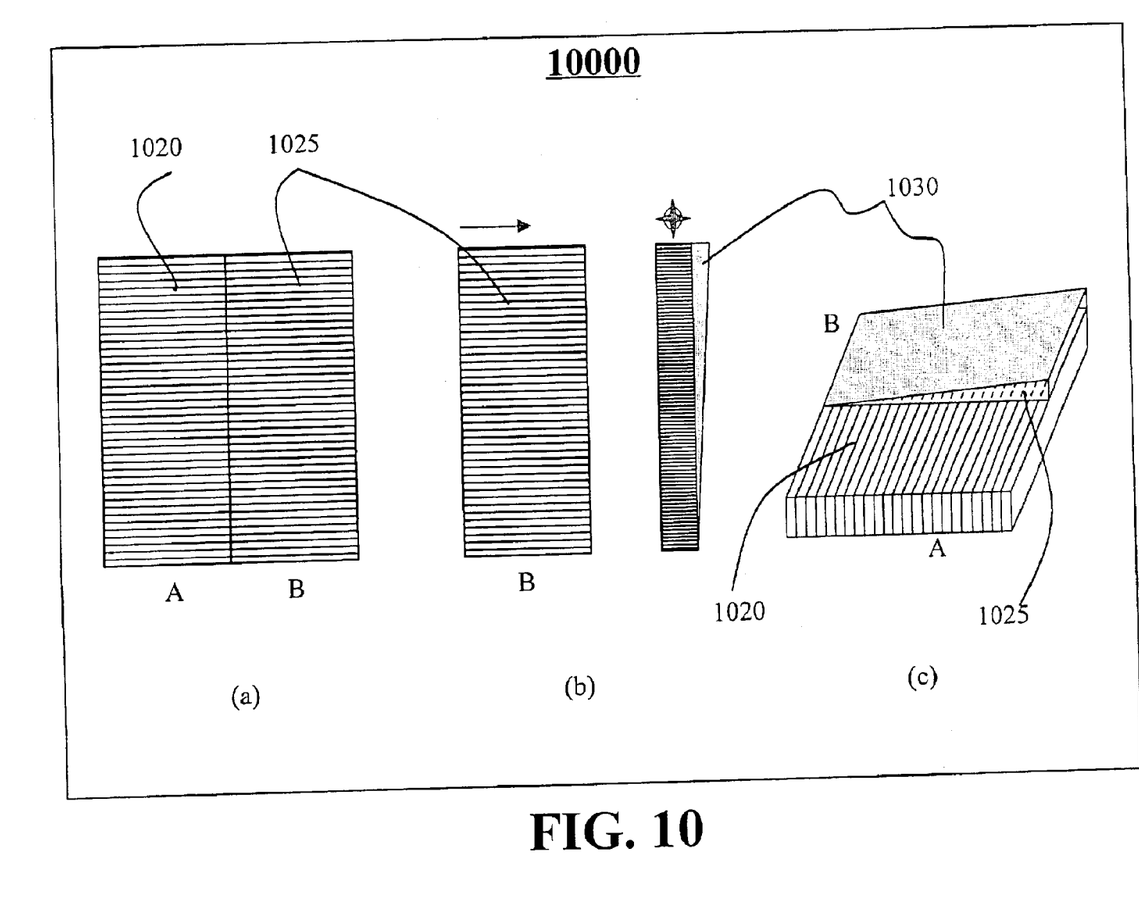
FIGS. 10(a)–10(c) is a schematic diagram illustrating a grating with a thin glass wedge for the device in FIG. 7.

Referring to FIG. 10, another approach to create two spatially-shifted sub-spectra for the purpose of generating a wide wavelength pass band with high isolation in a grating-based demultiplexer device is shown. The input unit is the same as shown and described for FIG. 1. However, a thin glass wedge is placed after the transmission grating 150. Specifically, the grating 150 shown in FIG. 1 is divided into two equal sections 1020 and 1025 as shown in FIG. 10(a). A thin glass wedge 1030 is attached to section 1025 as shown in FIGS. 10(b) and (c). The wedge 1030 can be cemented onto the grating or separated from the grating in order to provide freedom for adjustment.

Figure 11:
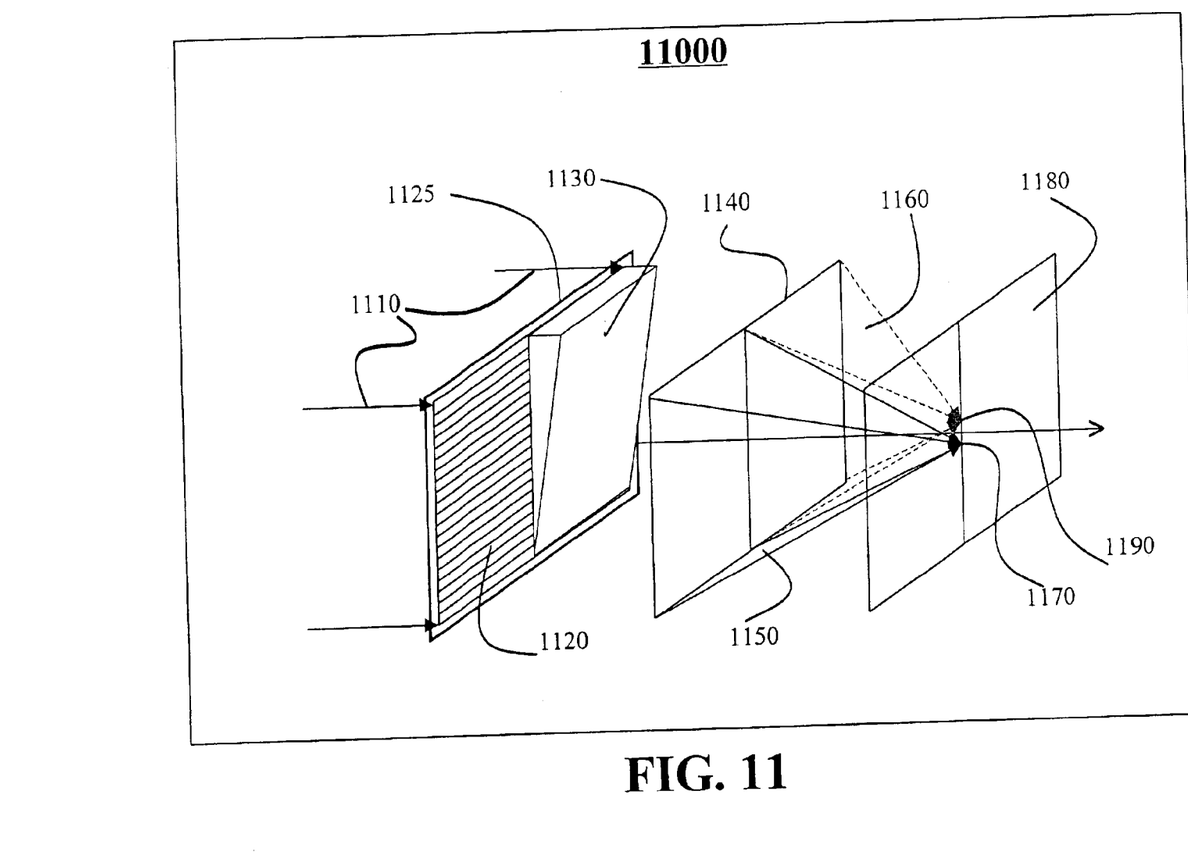
FIG. 11 is a schematic diagram illustrating a system to use with the grating shown in FIG. 10.

FIG. 11 shows the process of generating wide wavelength pass band spectrum by using a glass wedge 1130 with a grating 1125. The glass wedge 1130 and grating 1125 are the same wedge 1030 and grating 150 previously described. Specifically, and incident field 1110 of an optical beam is diffracted by the grating 1120 into spectral components. The beam from the grating 1120 that is transmitted through the glass wedge 1130 will deviate from its original propagation direction. After a focusing lens unit 1140, two groups of focused beams 1150 and 1160 with the same wavelength λ are formed. The focused beams 1150 and 1160 appear as two spots 1170 and 1190 on a receiving plane 1180 with a small spatial separation in the vertical direction determined by the shape of the glass wedge 1130. The spatial separation corresponds to a desired wavelength difference Δλ determined from the glass wedge 1130. Accordingly, two sub-spectra are generated and focused on the center of one particular receiving fiber at the location of the spots 1170 and 1190. The two wavelength components with a wavelength difference Δλ will overlap at that same receiving point. The two overlapped spectra will give rise to the desired flattened pass band spectrum profile 520 shown in FIG. 5(a).

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A device for expanding an operable wavelength band of an optical component receiving a wavelength division multiplexed (WDM) signal, the device comprising:
   a beam splitter for generating two optical beams angularly separated at a prescribed angle from the WDM signal;
   a collimating lens in optical communication with the beam splitter;
   an optical grating in optical communication with the collimating lens system,
   the optical grating configured to separate the optical beams from the collimating lens into spectral components;
   a focusing lens system in optical communication with the optical grating; and
   a receiving surface in optical communication with the focusing lens system;
   wherein the two sets of spectral components after the optical grating are focused on the receiving surface separated by the prescribed angle such that the pass band spectrum of the WDM signal is expanded.

2. The device of claim 1 wherein the optical grating is a volume phase grating.

3. The device of claim 1 wherein the focusing lens system comprises microlenses.

4. The device of claim 1 wherein the focusing lens system comprises bulk lenses.

5. The device of claim 1 wherein the receiving surface comprises an optical fiber array 2 comprising optical fibers receiving the pass band expanded WDM signal.

6. The device of claim 1 wherein the beam splitter is selected from the group consisting 2 of a prism, a wide-band fused fiber coupler, and a dual fiber capillary with a GRIN lens.

7. The device of claim 1 wherein the optical component is a demultiplexer.

8. The device of claim 1 wherein the optical component is a multiplexer.

9. A device for expanding an operable wavelength band of an optical component receiving a wavelength division multiplexed (WDM) signal, the device comprising:
   an optical grating having two sections in optical communication with the WDM signal, the optical grating configured to separate the WDM signal into spectral components;
   a glass wedge in optical communication with at least one section of the optical grating, the glass wedge configured to angularly deflect a section of the WDM signal by a prescribed angle to generate two sets of optical fields;
   a focusing lens system in optical communication with the two sets of output optical fields; and
   a receiving surface in optical communication with the focusing lens system;
   wherein the two optical fields are focused on the receiving surface separated by the prescribed angle such that the pass band spectrum of the WDM signal is expanded.

10. The device of claim 9 wherein the optical grating is a volume phase grating.

11. The device of claim 9 wherein the focusing lens system comprises microlenses.

12. The device of claim 9 wherein the focusing lens system comprises bulk lenses.

13. The device of claim 9 wherein the receiving surface comprises an optical fiber array comprising optical fibers receiving the pass band expanded WDM signal.

14. The device of claim 9 wherein the optical component is a demultiplexer.

15. The device of claim 9 wherein the optical component is a multiplexer.

16. A method for expanding an operable wavelength band of an optical component receiving a wavelength division multiplexed (WDM) signal with a device having a beam splitter, a collimating lens, an optical grating, a focusing lens system, and a receiving surface, the method comprising:
   a) splitting the WDM signal into two optical beams separated at a prescribed angle with a beam splitter;
   b) focusing the two optical beams onto the optical grating with the collimating lens;
   c) separating each optical beam into spectral components with the optical grating; and
   d) focusing the spectral components of diffracted light fields onto the receiving surface with the focusing lens system such that the two sets of fields are separated by the prescribed angle in order to expand the wavelength band of the WDM signal.

17. The method of claim 16 wherein the beam splitter in step (a) is selected from the group consisting of a prism, a wide-band fused fiber coupler, and a dual fiber capillary with a 3 GRIN lens.

18. The method of claim 16 wherein the optical grating in step (c) is a volume phase grating.

19. The method of claim 16 wherein the focusing lens system in step (d) comprises micro lenses.

20. The method of claim 16 wherein the focusing lens system in step (d) comprises bulk lenses.

21. The method of claim 16 wherein the receiving surface comprises an optical fiber and step (d) comprises focusing the spectral components onto the optical fiber of the receiving surface.

22. The method of claim 16 wherein the optical component is a demultiplexer.

23. The method of claim 16 wherein the optical component is a multiplexer.

24. A method for expanding an operable wavelength band of an optical component receiving a wavelength division multiplexed (WDM) signal with a device having an optical grating, a glass wedge, a focusing lens system, and a receiving surface, the method comprising:
   a) separating each optical beam into spectral components with the optical grating;
   b) splitting each of the spectral components into two optical beams having a prescribe angular separation with the glass wedge; and
   c) focusing the spectral components of the two beams onto the receiving surface with the focusing lens system such that the two optical beams are separated by the prescribed angle in order to expand the wavelength band of the WDM signal.

25. The method of claim 24 wherein the optical grating in step (a) is a volume phase rating.

26. The method of claim 24 wherein the focusing lens system in step (c) comprises microlenses.

27. The method of claim 24 wherein the focusing lens system in step (c) comprises bulk lenses.

28. The method of claim 24 wherein the receiving surface comprises an optical fiber array and step (c) comprises focusing the spectral component onto an optical fiber of the receiving surface.

29. The method of claim 24 wherein the optical component is a demultiplexer.

30. The method of claim 24 wherein the optical component is a multiplexer.

31. A device for expanding an operable wavelength band of an optical component receiving a wavelength division multiplexed (WDM) signal, the device comprising:

beam splitting means for generating two optical beams with a separation angle from the WDM signal;

collimating means in optical communication with the beam splitting means;

dispersion means in optical communication with the collimating means for separating each of the two optical beams into spectral components from the collimating means;

focusing means in optical communication with the dispersion means; and     receiving means in optical communication with the focusing means, the spectral components of the two optical beams are focused on the receiving means such that the pass band spectrum of the WDM signal is expanded.

32. The device of claim 31 wherein the dispersion means is an optical grating.

* * * * *